Bruno P. Striemer
Gene Fisher
INVENTOR

BY Victor J. Evans & Co.
ATTORNEYS

Patented June 20, 1939

2,163,111

UNITED STATES PATENT OFFICE 2,163,111

AUTOMATIC SPEED ALARM SWITCH

Bruno P. Striemer and Gene Fisher,
St. James, Minn.

Application April 4, 1938, Serial No. 199,979

1 Claim. (Cl. 200—56)

This invention relates to automatic speed alarms and has for an object to provide a circuit closer adapted to be secured to a motor vehicle speedometer without alterations to the speedometer, and having novel spring contacts adapted to be arranged to intercept the speedometer pointer at predetermined speed indications on the speedometer for closing an alarm circuit to indicate to night drivers and others when a predetermined speed is reached without the driver being compelled to glance at the speedometer to determine the speed at which the vehicle is traveling.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
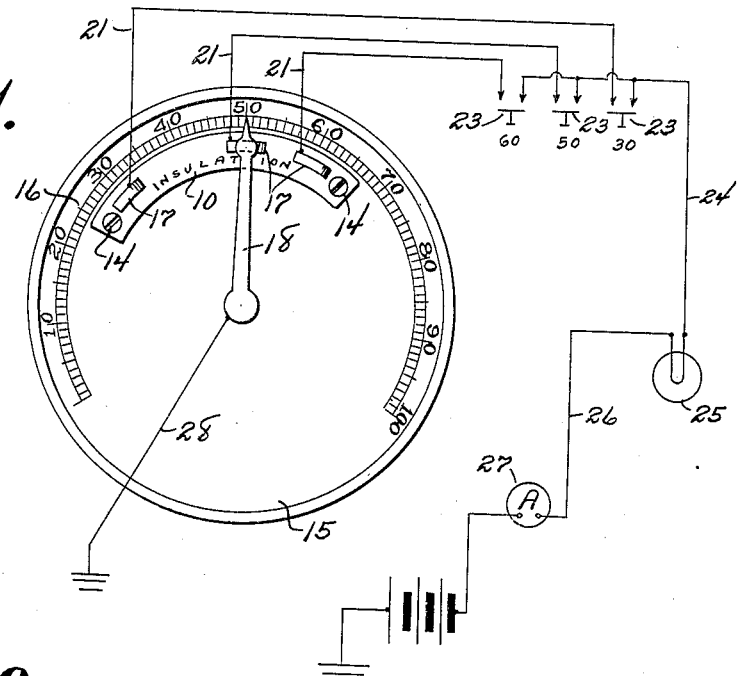
Figure 1 is a front elevation of a speedometer equipped with a speed indicator constructed in accordance with the invention and showing diagrammatically the electrical connections thereof.
Figure 2:
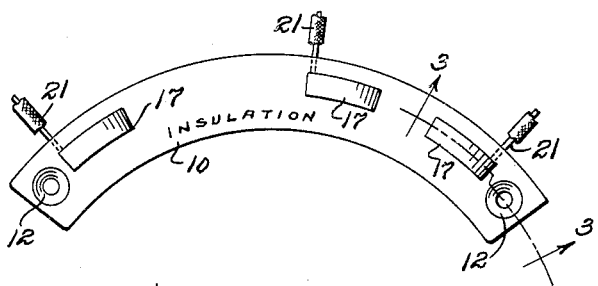
Figure 2 is a front elevation of the speed indicator.

Referring now to the drawing in which like characters of reference designate similar parts in the various views, 10 and 11 designate a pair of arcuate strips of insulation disposed in superposed position and provided at the ends with aligned openings 12 and 13 respectively, through which screws 14 may be passed to secure the strips together and to the dial of a speedometer 15 concentric with and just inside of the speed indicating scale 16.

A plurality of leaf spring switch contacts 17 are arranged at predetermined points on the upper strip 10, of the supporting base formed by the strips 10 and 11. The contacts are disposed in the path of movement of the pointer 18 of the speedometer and intercept the pointer at predetermined speed indicating numerals of the scale of the speedometer for closing an alarm circuit as will be presently described.

Each contact 17 is bent at one end to extend at an angle to the contact as shown at 18 and thence is directed at a right angle to the bent end 18 as shown at 19, and thence is again bent terminally as shown at 20 to extend parallel with the bent end 18. This deforming of the contact provides an attaching foot the parallel portions 18 and 20 of which may be engaged in respective openings in the upper plate 10 of the supporting base and the portion 19 between the parallel portions may be clamped between the opposed faces of both strips 10 and 11.

Figure 3:
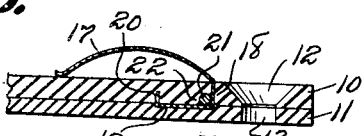
Figure 3 is a fragmentary longitudinal sectional view of the speed indicator taken on the line 3—3 of Figure 2 and showing one of the spring contacts.

Each contact is provided with a respective circuit wire 21 which may be inserted between the plates 10 and 11 and soldered as shown at 22 in the angle formed by the bent portions 18 and 20 of the attaching foot, as shown in Figure 3. The conductor wires 21 of each contact 17, is connected to a respective switch indicated diagrammatically at 23 in Figure 1, and the switches are connected by a conductor wire 24 to one side of a signal lamp 25, or other signal device, the other side of the lamp being connected by a conductor wire 26 to the ammeter 27.

The contacts 17 may be arranged to indicate speeds of 30, 50 and 60 miles per hour, and the switches 23 may be selectively closed to set the device for operation at any of these speeds.

It will be noted that the contacts 17 being formed of leaf spring material and being arcuate in contour, permit of good electrical connection being established between the pointer 18 which is grounded as shown at 28 and by virtue of the contact being fixed at one end and free at the opposite end, may yield as the pointer progresses thereover so as to permit free movement of the pointer at all times.

From the above description it is thought that the construction and operation of the invention will be fully understood without further explanation.

What is claimed is:

In an automatic speed alarm for motor vehicles, the combination of a speedometer having a speed responsive pointer and a dial displaying an arcuate scale having graduations forming speed indications, the pointer on the speedometer forming the movable member of a circuit closer, a pair of arcuate plates of insulating material secured to the dial inwardly of and concentric with said scale, said plates being disposed in superposed position to provide a switch base, and a plurality of arched spring contacts each having a free end bearing upon the outer face of the uppermost plate and having the opposite end directed to extend between the plates and clamped stationary by the plates, said contacts each forming the fixed member of a circuit closer with which the pointer has wiping engagement, the arched portion of each contact yielding as the pointer passes thereover to permit free movement of the pointer at all times.

BRUNO P. STRIEMER.
GENE FISHER.